(12) United States Patent
Tri (10) Patent No.: US 11,905,924 B2
(45) Date of Patent: Feb. 20, 2024

(54) SPREADER BOX

(71) Applicant: Barr Engineering Co., Minneapolis, MN (US)

(72) Inventor: Brian K. Tri, Minneapolis, MN (US)

( * ) Notice: Subject to any disclaimer, the term of this patent is extended or adjusted under 35 U.S.C. 154(b) by 232 days.

(21) Appl. No.: 17/653,416

(22) Filed: Mar. 3, 2022

(65) Prior Publication Data

US 2023/0279841 A1    Sep. 7, 2023

(51) Int. Cl.
*F03D 13/20*    (2016.01)

(52) U.S. Cl.
CPC ........ *F03D 13/20* (2016.05); *F05B 2230/604* (2013.01); *F05B 2240/912* (2013.01)

(58) Field of Classification Search
CPC ........................... F03D 13/20; F05B 2230/604
See application file for complete search history.

(56) References Cited

U.S. PATENT DOCUMENTS

| | | | | |
|---|---|---|---|---|
| 2012/0260592 A1* | 10/2012 | Wolf | ...................... | F03D 13/22 52/698 |
| 2013/0255169 A1* | 10/2013 | Henderson | .............. | E02D 27/32 52/223.13 |
| 2014/0069046 A1* | 3/2014 | Cai | .......................... | E04H 12/08 52/704 |
| 2014/0318033 A1* | 10/2014 | Coordes | .................. | E04H 12/34 52/745.18 |
| 2015/0089898 A1* | 4/2015 | Wobben | .................. | F03D 13/22 52/745.21 |
| 2018/0119381 A1* | 5/2018 | Garcia | .................. | E02D 27/425 |
| 2018/0258604 A1* | 9/2018 | Coordes | .................. | F03D 13/22 |
| 2018/0355851 A1* | 12/2018 | Brohm | .................... | F03D 13/22 |
| 2018/0355853 A1* | 12/2018 | Sandvad | ............... | E02D 27/425 |
| 2020/0271101 A1* | 8/2020 | Voss | ..................... | E04H 12/2269 |
| 2022/0325493 A1* | 10/2022 | Duarte Trigo | ........ | E02D 27/425 |
| 2022/0380996 A1* | 12/2022 | Henderson | .............. | E02D 27/42 |
| 2023/0028001 A1* | 1/2023 | Prass | ...................... | F03D 13/22 |

\* cited by examiner

*Primary Examiner* — Tulsidas C Patel
*Assistant Examiner* — Thomas K Quigley
(74) *Attorney, Agent, or Firm* — Carlson, Caspers, Vandenburgh & Lindquist, P.A.

(57) ABSTRACT

A spreader box for securing a tower having a flange to a pedestal having an embedded first bolt and second bolt includes a first surface coming into contact with the pedestal, a second surface coming into contact with the flange and a third surface and a fourth surface. The first, second, third and fourth surfaces form a hollow box-like shape. The spreader box also includes a first through-hole through the first and second surfaces for receiving the first bolt therethrough and a second through-hole through the first and second surfaces for receiving the second bolt therethrough.

18 Claims, 7 Drawing Sheets

SPREADER BOX

FIELD OF THE DISCLOSURE

The present application relates generally to tower installation, and more particularly to a spreader box for mounting a tower to a pedestal.

BACKGROUND

Today, more than 65,000 wind turbines across the country generate clean, reliable power. Wind power capacity today exceeds 125 Giga Watts, making it the third-largest source of electricity generation capacity in the country. Wind energy (or wind power) refers to the process of creating electricity using the wind or air flows that occur naturally in the earth's atmosphere. Wind turbines capture kinetic energy from the wind and use it to generate electricity. Wind turbines are comprised of rotating blades that are driven by the wind. The rotating blades then turn a shaft connected to a gearbox that converts the blade rotor's low speed, high-torque power into high-speed, low-torque power that is transferred to a generator to generate DC power. The DC power is then converted to AC electricity by power converters and transferred to cables that transmit the power to homes, businesses and other end-users through the power grid.

High amounts of force are exerted on the base of the wind turbine and its mount due to the wind force at the top of the turbine. Thus, the wind turbine must be anchored or mounted to a stable surface. Wind turbines must be mounted to a strong foundation, the underlying structure that transfers the loads to the earth. Larger wind turbines call for taller towers and larger foundations that consume enormous amounts of concrete and rebar. Wind turbine towers can exceed 260 feet in height and the blades can exceed 150 feet in length. As the wind blows across the blades and tower, a tipping force is exerted against the base of the tower. The foundation must resist this force and be stiff enough to keep the tower from rocking or tilting.

Larger wind towers capture more kinetic energy and thus produce more electricity. The longer the turbine blades the more energy a turbine can capture. Generally, doubling the rotor diameter produces a four-fold increase in energy output. Furthermore, the taller the tower is, the more energy it can capture because wind speeds increase with elevation. Therefore, the larger the wind tower, the more efficient it is at producing electricity. However, there are limitations to the size a wind tower can be and still be easily shipped. There are also practical limitations on the diameter and grade of steel that connect the tower to the foundation. Larger turbines are beginning to push the limit on the practical limits of steel strength. Thus, as wind turbines become larger and larger, improvements to methods and apparatuses of mounting the wind tower to its foundation are desirable without the diameter of the tower getting larger.

SUMMARY

In a first aspect of the present invention, a spreader box for securing a tower having a flange to a pedestal having an embedded first bolt and second bolt is disclosed. The spreader box includes a first surface coming into contact with the pedestal, a second surface coming into contact with the flange and a third surface and a fourth surface. The first, second, third and fourth surfaces form a hollow box-like shape. The spreader box also includes a first through-hole through the first and second surfaces for receiving the first bolt therethrough and a second through-hole through the first and second surfaces for receiving the second bolt therethrough.

In a second aspect of the present invention, a spreader box for securing a tower having a flange to a pedestal having an embedded first bolt and second bolt is disclosed. The spreader box includes a first surface coming into contact with the pedestal, a second surface coming into contact with the flange, a third surface and a fourth surface. The first, second, third and fourth surfaces form a hollow box like shape. The spreader box also includes a first through-hole through the first and second surfaces for receiving the first bolt therethrough and a second through-hole through the first and second surfaces for receiving the second bolt therethrough. The spreader box also includes at least one slot in the second surface and grout contained within the box-like shape.

In a third aspect of the present invention, a method of securing a tower having a flange to a pedestal having an embedded first bolt and second bolt is disclosed. The method includes: placing a spreader box on the pedestal aligning the first bolt with a first through-hole in the spreader box, such that the first bolt goes through the first through-hole and extends beyond the spreader box, and aligning the second bolt with a second through-hole in the spreader box, such that the second bolt goes through the second through-hole and extends beyond the spreader box; placing grout on the pedestal; placing the flange on the spreader box and aligning the first bolt with a third through-hole in the flange such that the first bolt goes through the first through-hole in the flange and extends beyond the flange and aligning the second bolt with a fourth through-hole in the flange such that the second bolt goes through the second through-hole and extends beyond the flange; filling the spreader box with grout; and securing the flange to the pedestal by tightening nuts to the first bolt and the second bolt.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the disclosed system and methods, reference is now made to the following descriptions taken in conjunction with the accompanying drawings.

DETAILED DESCRIPTION

In general, a spreader box has a shell of steel and is hollow inside. The spreader box is filled with grout to create a solid platform for mounting a tower on. The spreader box spreads out the load from the tower before the load is transferred to the foundation of the tower. The spreader box also has slots in a top surface to allow air to escape and for lateral flow of the grout during placement. Because the spreader box is hollow, it can be transported and installed easier than a solid plate. And, the spreader box can be made bigger than would be possible with a spreader plate. Additionally, the spreader box is more efficient in the transfer of loads than a spreader plate once it is filled with grout.

A spreader box for securing a tower having a flange to a pedestal having an embedded first bolt and second bolt includes a first surface coming into contact with the pedestal, a second surface coming into contact with the flange, a third surface and a fourth surface. The first, second, third and fourth surfaces form a hollow box like shape. The spreader box also includes a first through-hole through the first and second surfaces for receiving the first bolt therethrough and a second through-hole through the first and second surfaces for receiving the second bolt therethrough. The spreader box also includes at least one slot in the second surface and grout contained within the box-like shape.

A method of securing a tower having a flange to a pedestal having an embedded first bolt and second bolt includes: placing a spreader box aligning the first bolt with a first through-hole in the spreader box, such that the first bolt goes through the first through-hole and extends beyond the spreader box, and aligning the second bolt with the second through-hole in the spreader box, such that the second bolt goes through the second through-hole and extends beyond the spreader box; placing grout on the pedestal; placing the flange on the spreader box and aligning the first bolt with a third through-hole in the flange such that the first bolt goes through the first through-hole in the flange and extends beyond the flange and aligning the second bolt with a fourth through-hole in the flange such that the second bolt goes through the second through-hole and extends beyond the flange; filling the spreader box with grout; and securing the flange to the pedestal by tightening nuts to the first bolt and the second bolt.

Figure 1:
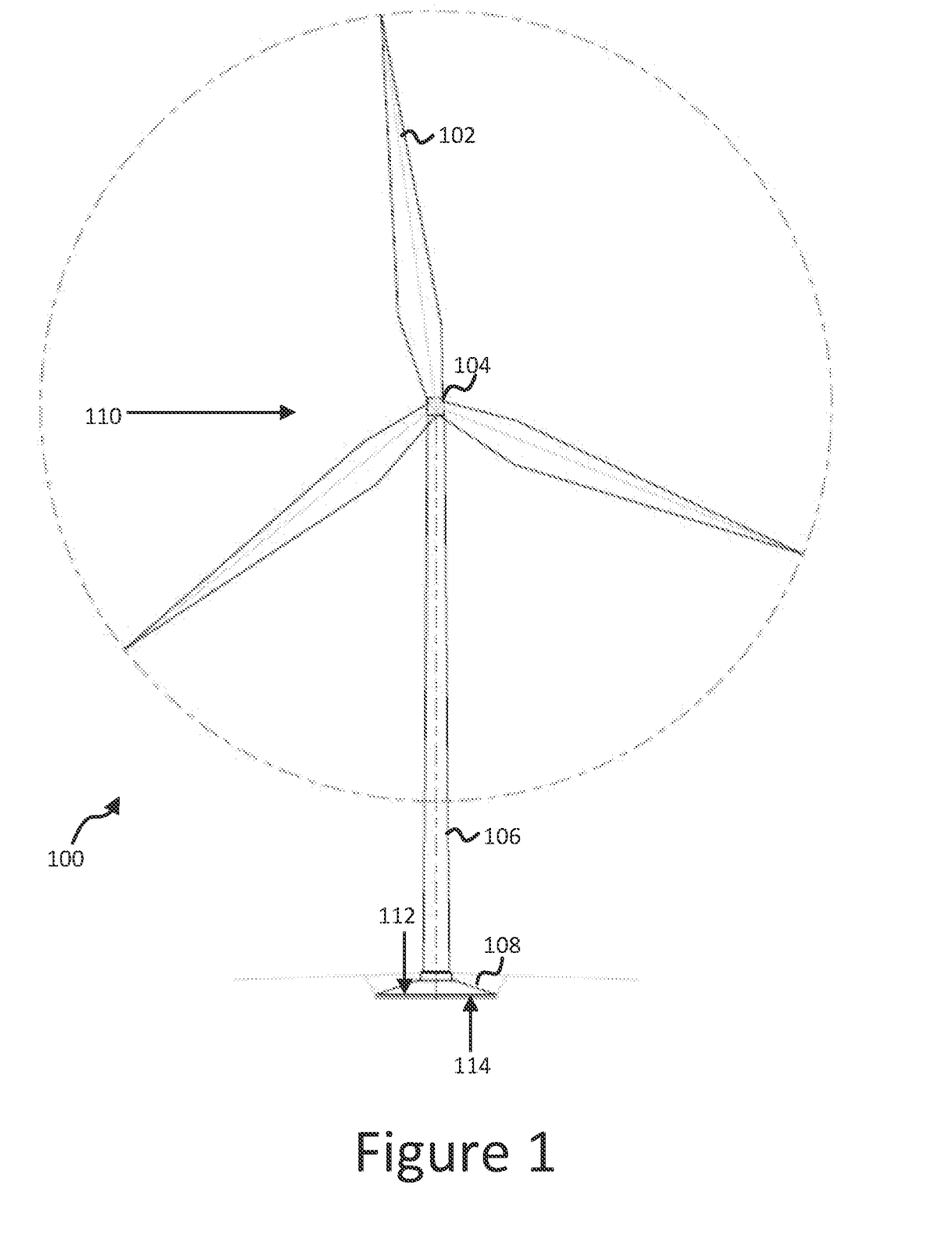
FIG. 1 is a schematic drawing of a wind tower, according to one example embodiment of the present invention.

Referring to FIG. 1, a schematic of a wind tower 100 is shown. The wind tower includes rotating blades 102 connected to a generator 104 mounted to a tower 106. The combination of the blades 102 and the generator 104 is also referred to as a wind turbine. The tower is anchored to a foundation 108. As the wind 110 blows, it exerts a tipping force against the tower and rotates the blades 102. A force 112, including a tipping force from the wind 110 and the weight of the wind tower 100 are exerted against the foundation 108. The earth must resist this force 112 with a soil resistance force 114 such that the tower 100 can stand and not rock in the wind. Thus, the foundation 108 and the mounting of the tower 106 to the foundation 108 must be engineered to resist the force 112 and transfer the loads to the earth.

Figure 2:
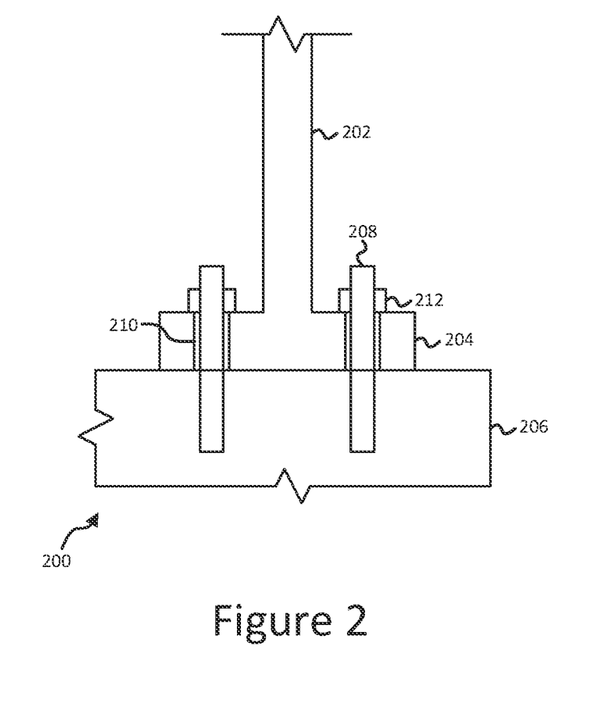
FIG. 2 is a cross-sectional drawing of the wind tower of FIG. 1 anchored to a pedestal, according to one example embodiment of the present invention.

Referring to FIG. 2, a cross-sectional view of a mounting 200 of a tower to a concrete pedestal is shown. The wind tower 202 has a base or flange 204. The flange 204 sits on top of a concrete pedestal or foundation 206, often on a bed of leveling grout (not shown). The pedestal 206 includes bolts 208 that were embedded into the concrete during formation of the pedestal 206. The bolts 208 are placed to align with through-holes 210 in the flange 204 of the tower 202. The tower 202 is placed on the pedestal 206 such that the bolts 208 extend through the through-holes 210. Nuts 212 are then screwed onto the bolts 208 and tightened to secure the tower 202 to the pedestal 206 during installation.

Figure 3:
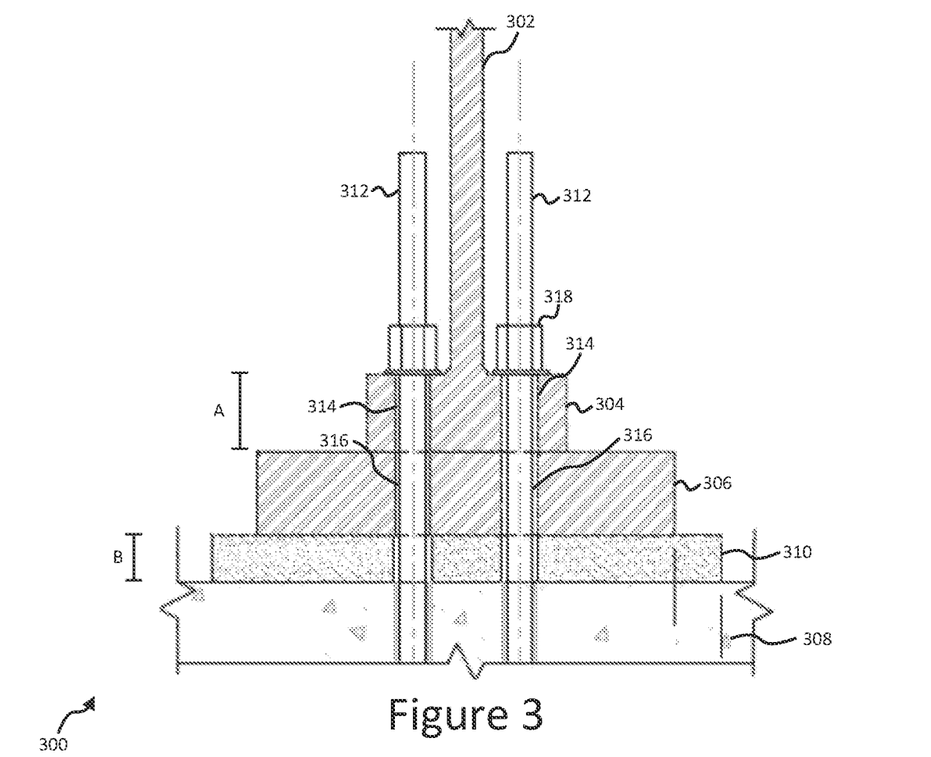
FIG. 3 is a cross-sectional view of a tower anchored to a pedestal using a spreader plate, according to one example embodiment of the present invention.

Referring to FIG. 3, an apparatus 300 and method of connecting or mounting a tower 302 is shown. The wind tower 302 has a base or flange 304. Preferably, the flange 304 has a depth A that is typically between two and six inches. Other depths are also possible. The flange 304 sits on top of a spreader plate 306, typically made of steel. The spreader plate 306 spreads the load out, such as load 112 of FIG. 1, from the flange 304 before the load is transferred to a concrete pedestal or foundation 308. Preferably, a layer of grout 310 is placed between the spreader plate 306 and the pedestal 308 to aid in mounting of the tower 302 and to further spread the load out. Preferably, the grout has a depth B and typically is between one and six inches. Other depths are also possible. It is also possible to mount the tower without using grout 310.

The pedestal 308 includes flange bolts 312 that are embedded into the concrete during formation of the pedestal 308. The flange bolts 312 are embedded to align with through-holes 314 in the flange 304 of the tower 302. The spreader plate 306 also includes through-holes 316 that align with the bolts 312. The tower 302 is placed on the pedestal 308 such that the flange bolts 312 extend through the through-holes 314 and 316. Nuts 318 are then placed on the flange bolts 312 to secure the tower 302.

Figure 4:
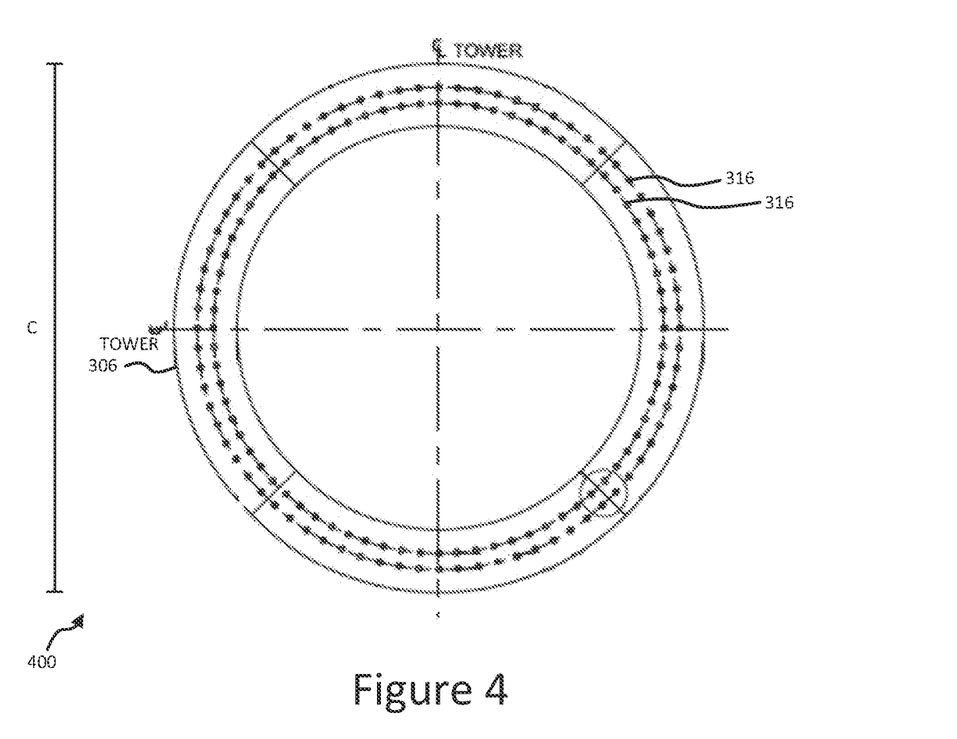
FIG. 4 is a plan view of the spreader plate of FIG. 3, according to one example embodiment of the present invention.

Referring to FIG. 4, a plan view of a spreader plate 400, the spreader plate 306 of FIG. 3, is illustrated installed. The spreader plate 306 includes the through holes 316. The spreader plate 306 can be a continuous ring or made in sections. As shown in FIG. 4, the spreader plate 306 is illustrated in four sections for ease of installation around the pedestal. Typically, the spreader plate 306 has a diameter C of between 10 and 20 feet.

Figure 5:
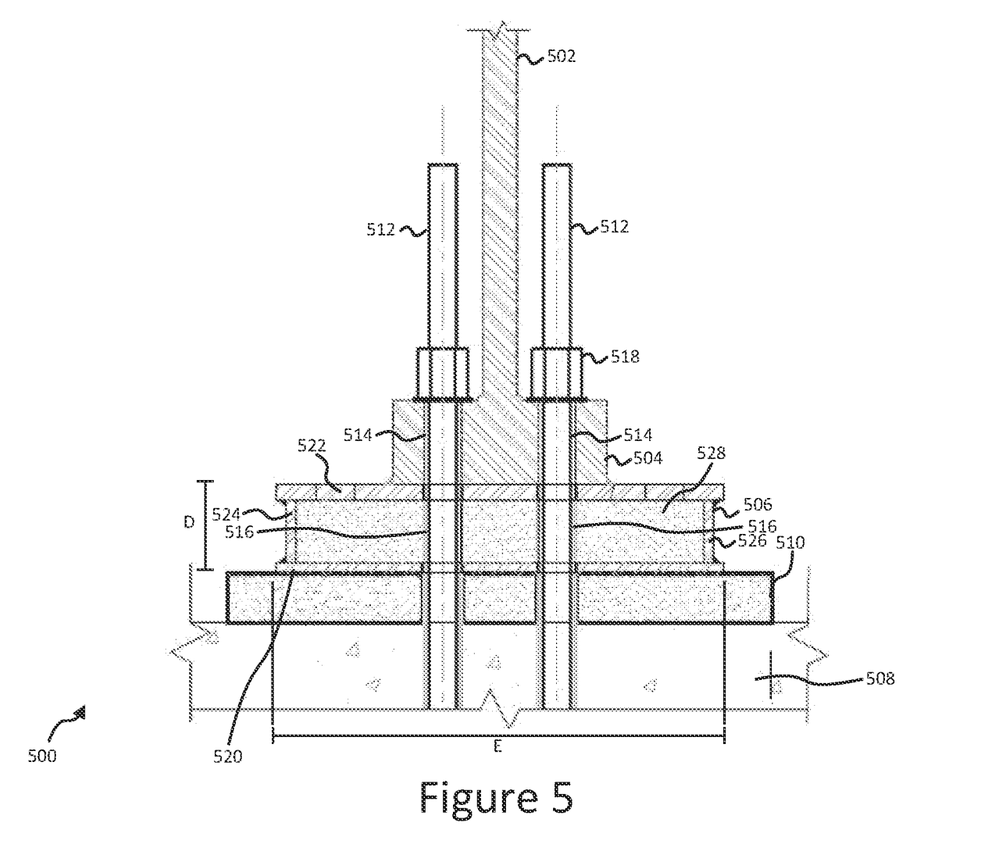
FIG. 5 is a cross-sectional view of a tower anchored to a pedestal using a spreader box, according to one example embodiment of the present invention.

Referring to FIG. 5, an apparatus 500 and method of connecting or mounting a tower 502 is shown. The wind tower 502 has a base or flange 504. The flange 504 sits on top of a spreader box 506. The spreader box 506 spreads the load out, such as load 112 of FIG. 1, from the flange 504 before the load is transferred to a concrete pedestal or foundation 508. Preferably, a layer of grout 510 is placed between the spreader box 506 and the pedestal 508 to aid in mounting of the tower 502 and to further spread the load out. It is also possible to mount the tower without using grout 510.

The pedestal 508 includes flange bolts 512 that are embedded into the concrete during formation of the pedestal 508. The flange bolts 512 are embedded to align with through-holes 514 in the flange 504 of the tower 502. The spreader plate 506 also includes through-holes 516 that align with the bolts 512. The tower 502 is placed on the pedestal 508 such that the flange bolts 512 extend through the through-holes 514 and 516 and above the spreader box 506. Nuts 518 are then placed on the flange bolts 512 to secure the tower 502.

Because there are limits on the strength of steel, a spreader box 506 is illustrated, as opposed to the spreader plate 306 of FIG. 3. The spreader box 506 is a shell box, preferably hollow inside and made out of steel. The spreader box 506 has a first surface 520, a second surface 522, a third surface 524 and a fourth surface 526. The first, second, third and fourth surfaces form a shell 506 having a generally box-like shape that is hollow within. The first surface 520 comes in contact with the grout 510. The second surface 522 comes in contact the flange 504 of the tower 502. The third and fourth surfaces 524, 526 are the side of the box to form a hollow shell. The spreader box 506 has a depth D. Preferably, the depth D is between 2 and 12 inches. Any suitable depth could be used. The spreader box 506 also has a width E. Preferably, the width E is between 12 and 36 inches.

The hollow spreader box 506 is lighter and easier to install. It can also be made bigger than would be possible with the spreader plate 306 of FIG. 3. Preferably, the spreader box 506 is filled with grout 528. The grout 528 increases the strength of the spreader box 506. The spreader box 506 has an advantage over the spreader plate in ease of installation and strength because of the combination of a steel shell filled with grout. Thus the spreader box 506 can be made larger than the spreader plate and still be more easily transported and installed.

Figure 6:
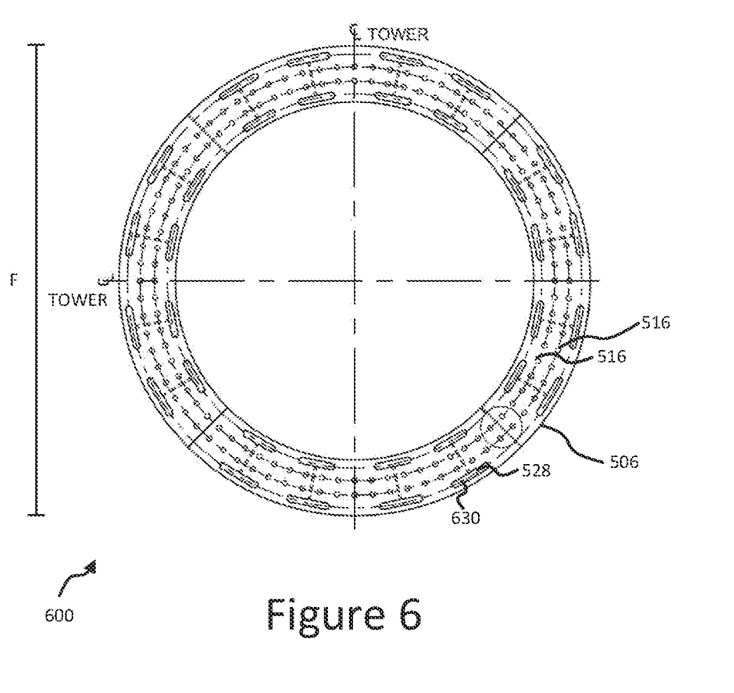
FIG. 6 is a plan view of the spreader box of FIG. 5, according to one example embodiment of the present invention.

Referring to FIG. 6, a plan view of a spreader box 600, the spreader box 506 of FIG. 5, is illustrated installed. The spreader box 506 includes the through holes 516. The spreader box 506 can be a continuous ring or made in sections. As shown in FIG. 6, the spreader plate 506 is illustrated in four sections for ease of installation around the pedestal. Typically, the spreader box 506 has a diameter F of between 10 and 20 feet. Also the spreader box 506 includes slots 518. When the spreader box 506 is filled with grout, the slots 518 allow air to escape and for lateral flow of the grout during placement.

Figure 7:
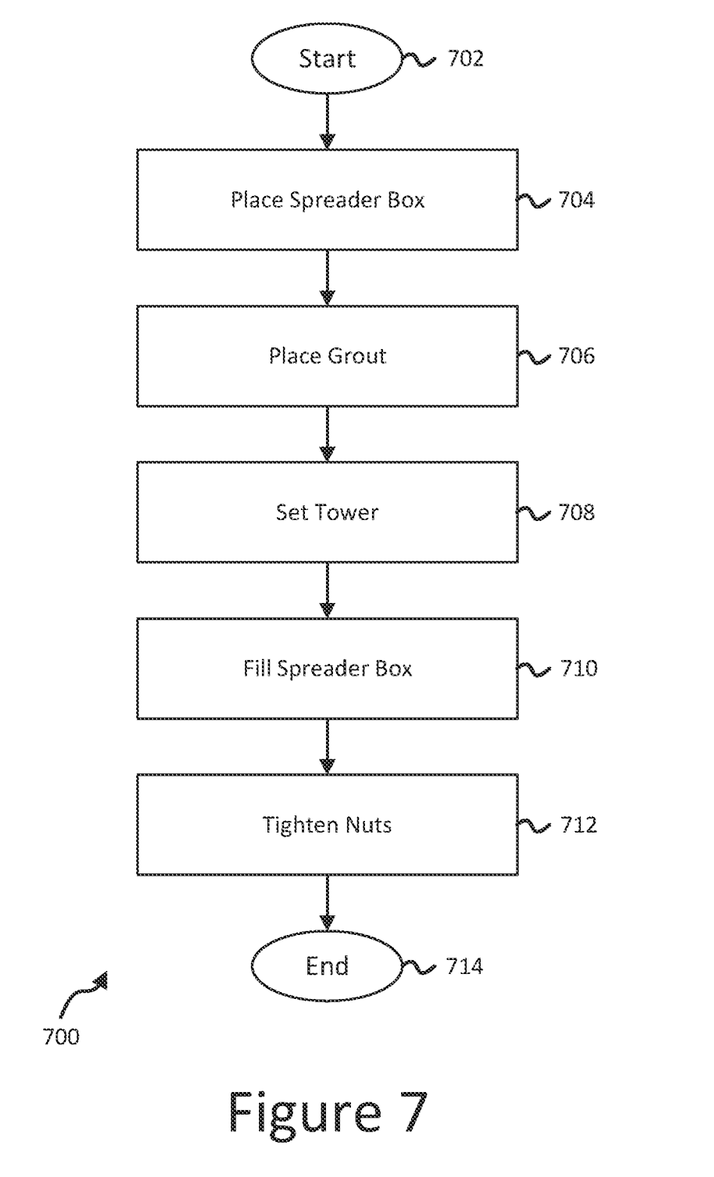
FIG. 7 is a flow diagram of a method of securing a tower to a pedestal using a spreader box, according to one example embodiment of the present invention.

FIG. 7 is a flow diagram of a method 700 of installing a tower on a pedestal. The method begins at 702. At 706, a spreader box, such as spreader box 506 of FIG. 5, is placed on top of the pedestal (via steel shims) aligning through-holes in the spreader box with flange bolts, such as flange bolts 512 of FIG. 5, embedded in the pedestal. At 704, a layer of grout, such as grout 510 of FIG. 5, is placed over the pedestal or foundation, such as the pedestal 508 of FIG. 5, and the grout is allowed to cure. At 710, a tower, such as the tower 502 of FIG. 5, is set on top of the spreader box aligning the flange bolts with through-holes in the flange of the tower. At 708, the spreader box is filled with grout, and the grout is allowed to cure. At 712, nuts, such as nuts 518 of FIG. 5, are tightened onto the flange bolts to secure the tower to the pedestal though the spreader box and the layer of grout. Flow ends at 714.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

I claim:

1. A spreader box for securing a tower having a flange to a pedestal having an embedded first bolt and second bolt, the spreader box comprising:
   a first surface coming into contact with the pedestal;
   a second surface coming into contact with the flange;
   a third surface and a fourth surface, the first, second, third and fourth surfaces forming a hollow box-like shape;
   a first through-hole through the first and second surfaces for receiving the first bolt therethrough; and
   a second through-hole through the first and second surfaces for receiving the second bolt therethrough;
   wherein during installation the spreader box is placed between the flange and the pedestal to spread out load from the flange to the pedestal.

2. The spreader box of claim 1, further comprising at least one slot in the second surface.

3. The spreader box of claim 1, further comprising grout contained within the box like shape.

4. The spreader box of claim 1, wherein the box like shape has a depth of between 2 and 12 inches.

5. The spreader box of claim 1, wherein the box like shape has a depth of between 12 and 36 inches.

6. The spreader box of claim 1, wherein the spreader box is comprised of steel.

7. The spreader box of claim 1, wherein the spreader box is one continuous piece extending around the entire circumference of the flange of the tower.

8. The spreader box of claim 7, wherein the spreader box extends around the entire circumference of the tower and is made up of multiple pieces of steel.

9. The spreader box of claim 1, wherein the spreader box only partially extends around an entire circumference of the flange.

10. A spreader box for securing a tower having a flange to a pedestal having an embedded first bolt and second bolt, the spreader box comprising:
    a first surface coming into contact with the pedestal;
    a second surface coming into contact with the flange;
    a third surface and a fourth surface, the first, second, third and fourth surfaces forming a hollow box like shape;
    a first through-hole through the first and second surfaces for receiving the first bolt therethrough;
    a second through-hole through the first and second surfaces for receiving the second bolt therethrough;
    at least one slot in the second surface;
    grout contained within the box-like shape; and wherein during installation the spreader box is placed between the flange and the pedestal to spread out load from the flange to the pedestal.

11. The spreader box of claim 10, wherein the box like shape is comprised of steel.

12. The spreader box of claim 10, wherein the spreader box is one continuous piece extending around the entire circumference of the flange of the tower.

13. The spreader box of claim 12, wherein the spreader box extends around the entire circumference of the tower and is made up of multiple pieces of steel.

14. The spreader box of claim 10, wherein the spreader box only partially extends around an entire circumference of the flange.

15. A method of securing a tower having a flange to a pedestal having an embedded first bolt and second bolt, the method comprising:
   placing a spreader box on the pedestal aligning the first bolt with a first through-hole in the spreader box, such that the first bolt goes through the first through-hole and extends beyond the spreader box, and aligning the second bolt with a second through-hole in the spreader box, such that the second bolt goes through the second through-hole and extends beyond the spreader box;
   placing grout on the pedestal;
   placing the flange on the spreader box and aligning the first bolt with a third through-hole in the flange such that the first bolt goes through the first through-hole in the flange and extends beyond the flange and aligning the second bolt with a fourth through-hole in the flange such that the second bolt goes through the second through-hole and extends beyond the flange;
   filling the spreader box with grout; and
   securing the flange to the pedestal by tightening nuts to the first bolt and the second bolt.

16. The method of claim 15, wherein a layer of grout is placed between the pedestal and the flange prior to placing the flange.

17. The method of claim 15, wherein the spreader box extends around an entire circumference of the flange.

18. The method of claim 15, wherein the spreader box only partially extends around an entire circumference of the flange.

* * * * *